United States Patent [19]

Smith

[11] Patent Number: 4,739,651
[45] Date of Patent: Apr. 26, 1988

[54] THROTTLE BODY WITH INTERNALLY MOUNTED ANEMOMETER

[75] Inventor: David H. Smith, Mercer Island, Wash.

[73] Assignee: Air Sensors, Inc., Seattle, Wash.

[21] Appl. No.: 887,821

[22] Filed: Jul. 28, 1986

[51] Int. Cl.⁴ ........................................... G01M 19/00
[52] U.S. Cl. ................................................. 73/118.2
[58] Field of Search .................... 73/118.2, 118.1, 204; 123/494

[56] References Cited

U.S. PATENT DOCUMENTS

| | | | |
|---|---|---|---|
| 4,264,961 | 4/1981 | Nishimura et al. | |
| 4,414,847 | 11/1983 | Kohama et al. | 73/118.2 |
| 4,463,601 | 8/1984 | Rask | 73/118.2 |
| 4,523,461 | 6/1985 | Watkins | |
| 4,555,937 | 12/1985 | Sumal | 73/118.2 |
| 4,571,996 | 2/1986 | Wakeman et al. | 73/202 |

FOREIGN PATENT DOCUMENTS

| | | | |
|---|---|---|---|
| 0023818 | 2/1982 | Japan | 73/204 |
| 0074616 | 5/1982 | Japan | 73/118.2 |
| 0160817 | 9/1983 | Japan | 73/204 |
| 0004813 | 1/1985 | Japan | 73/204 |
| 0173946 | 3/1986 | Japan | 73/204 |

Primary Examiner—Stewart J. Levy
Assistant Examiner—Robert R. Raevis
Attorney, Agent, or Firm—Seed and Berry

[57] ABSTRACT

A throttle body for an internal-combustion engine having a hollow venturi member positioned within the body. The member has a first portion projecting out of the body at its intake end, and a second portion positioned generally centrally within the body air duct upstream from a throttle plate. The second portion has an exterior surface spaced inward from the body interior sidewall to form an annular venturi passage therebetween. The first and second portions define an enclosed air channel. Circumferentially distributed entry openings in the first portion open exterior of the body duct for entry of air into the channel, and circumferentially distributed exit openings in the second portion communicating with the venturi air passage for the exit of air from the channel. The channel and the entry and exit openings define a sample flow path of air from a location exterior of the duct to a location adjacent to the venturi passage representative of the air mass flow through the duct. An anemometer sensor is positioned in the channel in the sample airflow path. The first portion of the venturi member has a bluff body shape to create a low pressure zone thereabout when air through the body duct is reversed to substantially eliminate airflow through the venturi member as a result of engine backflow pulsations.

29 Claims, 2 Drawing Sheets

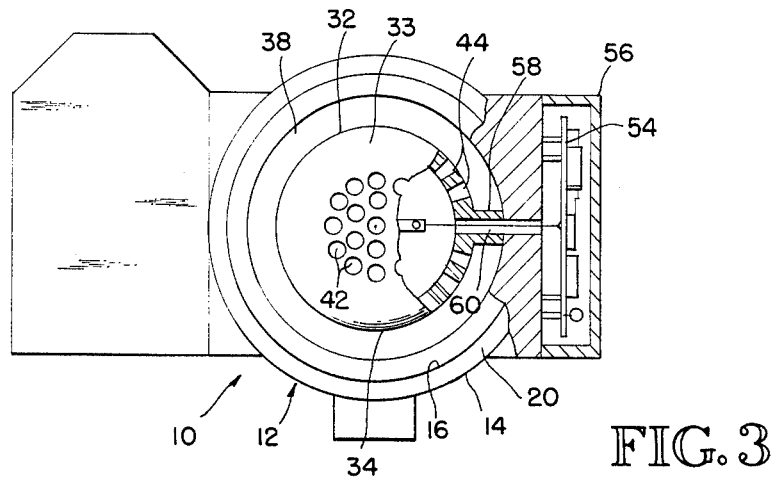

4,739,651

THROTTLE BODY WITH INTERNALLY MOUNTED ANEMOMETER

DESCRIPTION

1. Technical Field

The present invention relates generally to anemometry, and more particularly, to a throttle body constructed for mounting of a hot wire or film electronic anemometer in a sample airflow path within the throttle body.

2. Background of the Invention

It is often necessary or useful to know the mass of air flowing through a passageway. While there are many applications for an anemometer or air mass sensor, an application of particular interest is in an internal-combustion engine. For an automobile engine with electronic fuel injection and ignition systems, air mass flow into the engine is one of several important sensed conditions useful in generating an electrical signal which controls and optimizes performance of those systems.

One type of conventional air mass sensor utilizes a temperature-dependent resistive wire, such as platinum wire, having an electrical resistance proportional to its temperature. The resistive wire is placed in the air mass flow of a passageway, and an electrical circuit supplies electric current to the wire. The circuit automatically regulates the flow of current through the resistive wire to maintain its resistance and hence its temperature constant, and measures that current. The measured current (or a voltage proportional thereto) indicates the mass of air per unit of time flowing through the passageway, and is used by the circuit to generate an air mass flow-indicating signal. Similar types of air mass sensors utilize a temperature-dependent resistive metallic film.

While having proven advantages, it is difficult to mount a hot wire or film air mass sensor in the air induction system of an internal-combustion engine to produce accurate and reliable readings. In the past, a hot wire sensor has been mounted within a conduit leading the engine throttle body and forming a part of the engine air induction system. One such arrangement is shown in U.S. Pat. No. 4,523,461. While this arrangement works well, it is very desirable to locate the air mass sensor in a position where it directly measures the air mass flow as it actually passes through the throttle body. Moreover, it is desirable to sample the air mass flow in the central portion of the throttle body, and not just the air mass flow adjacent to one portion of the throttle body wall. Because of the harsh environment that exists in the throttle body during operation of the internal-combustion engine, it is not practical to merely position a hot wire or film sensor so that it extends across the throttle body throat.

In the past, throttle body bypass channels or passages in which a heated sensor is mounted have been used, such as shown in U.S. Pat. No. 4,264,961. With this arrangement, a bypass passage located to one side of the throttle body has an inlet port communicating with the interior air duct of the throttle body air duct of the throttle body toward its upper open end, and outlet port communicating with the throttle body air duct at about the venturi constriction. A heat generator is positioned in the bypass passage and is connected to a air flow meter which generates an output voltage signal.

The engine air flow over the venturi causes a depression in the static pressure at the bypass passage outlet port and the resulting pressure differential in the bypass passage causes a fixed fraction of the engine air mass flow to pass into the inlet port and over the sensor. The sensor measures this fraction of the engine air mass flow and from that the total engine air mass flow is deduced. This design, however, has several disadvantages. The inlet port comprises a single orifice located to one side of the throttle body and draws air from only a localized area within the throttle body air duct and adjacent to one portion of the air filter mounted on the throttle body. Should local variations in filter clogging affect the air flow in that localized area about the inlet port, the air mass flow measured is affected, and the measured flow is no longer in the same proportion to the total engine air mass flow. This produces inaccuracies and erroneous engine air mass flow readings.

A similar problem exists as a result of the outlet port being a single orifice located to one side of the throttle body. The air mass flow of the bypass passage is exhausted into only a localized area within the throttle body air duct of the throttle body and adjacent to one edge portion of the butterfly throttle plate valve located below the outlet port. As the butterfly valve opens and closes, the air flow past the butterfly is not even at all points about its perimeter, and the particular location selected for the outlet port affects the air mass flow through the bypass passage, and hence the accuracy of the air mass flow measured. As a general matter, the downside of the butterfly valve permits more flow than the upside of the valve. Since no one position for the outlet port of the bypass passageway is relative to the butterfly valve it is believed representative of the total engine air mass flow for all valve opening and closing positions, the measured flow is almost always inaccurate. This is in addition to any inaccuracy created by the fact that the engine air filter may be dirty in a spot which affects the accuracy.

Another disadvantage of using a bypass passage is its sensitivity to engine backflow pulsations that are very pronounced at low speed wide open throttle running. When air mass flows for even a short pulse in the reverse direction through the throttle body air duct, a pressure differential is created across the bypass passage inlet and outlet ports much as when the air mass flow is flowing in the normal flow direction toward the engine. This causes air to enter the inlet port and exit from the outlet port even though the actual flow in the throttle body air duct is reveresed. This air mass flow in the bypass passage which is not at all representative of the engine air mass flow, creates an air mass flow reading as it passes the heated sensor located in the passage. The air mass flow measured is not discernible from the engine air mass flow in the normal direction, thus gross errors in computing of the actual engine air mass flow can occur when a reverberation condition exists.

It will therefore be appreciated that there has been a significant need for a throttle body with an air mass sensor mounted therein in a manner which avoids the disadvantages described above, and which provides accurate readings of the air mass flow through the throttle body without being affected by dirty spots in the air cleaner, the position of the sensor relative to the butterfly, or engine backflow pulsations. The present invention fulfills these needs and further provides other related advantages.

DISCLOSURE OF THE INVENTION

The present invention resides a throttle body for an internal-combustion engine. The throttle body includes a hollow body having an interior sidewall defining a longitudinal open air duct leading from an open intake end and to an open discharge end, a throttle plate within the duct toward the body discharge end, and a hollow venturi member. The venturi member has a first member portion projecting out of the duct at the body intake end, and a second member portion positioned generally centrally within the duct upstream from the throttle plate. The second member portion has an exterior surface portion spaced inward from the body interior sidewall to form a generally annular restricted venturi air passage therebetween. The first and second member portions define an enclosed air channel therewithin.

The venturi member has first flow means for communicating air between the air space exterior of the body intake end and the venturi member channel. In the preferred embodiment of the invention, the first flow means includes a plurality of circumferentially spaced apart entry openings in the first member portion positioned to draw air generally uniformly from the air space around the first member portion and outward of the duct.

The venturi member also has second flow means for communicating air between the channel and the annual venturi air passage in a circumferentially distributed manner. In the preferred embodiment the second flow means includes a plurality of circumferentially spaced apart exit openings in the second member portion positioned to pass air generally uniformly into the venturi air passage. The exit openings exit through the exterior surface portion of the second member portion forming the venturi and are in coplanar and generally evenly circumferentially spaced apart arrangement.

The channel and the first and second flow means define a sample flow path of air from a location exterior of the duct to a location adjacent to the venturi air passage which is representative of the air flow through the duct. A heatable anemometer sensor is positioned within the channel in the sample air flow path for air mass flow measurement purposes. Means are also provided to support the venturi member in the duct. The support means includes an elongated blade shaped arm extending generally axially within the duct. The arm is rigidly attached to and extends between the venturi member and the body.

The first member portion has an outwardly facing end wall closing the air channel and through which the entry openings pass. The end wall has an exterior surface shaped to create a low pressure zone thereabout when flow through the duct is reversed, with the pressure being substantially the same low pressure created in the venturi passage from the reversed air flow. In a preferred embodiment the end wall has an outwardly curving, generally parabolic exterior surface shape.

Other features and advantages of the invention will become apparent from the following detailed description, taken in conjunction with the accompanying drawings.

BRIEF DESCRIPTION OF THE DRAWINGS

FIG. 3 is a fragmentary, partial sectional plan view of the throttle body of FIG. 1, with the air cleaner removed.

BEST MODE FOR CARRYING OUT THE INVENTION

Figure 1:
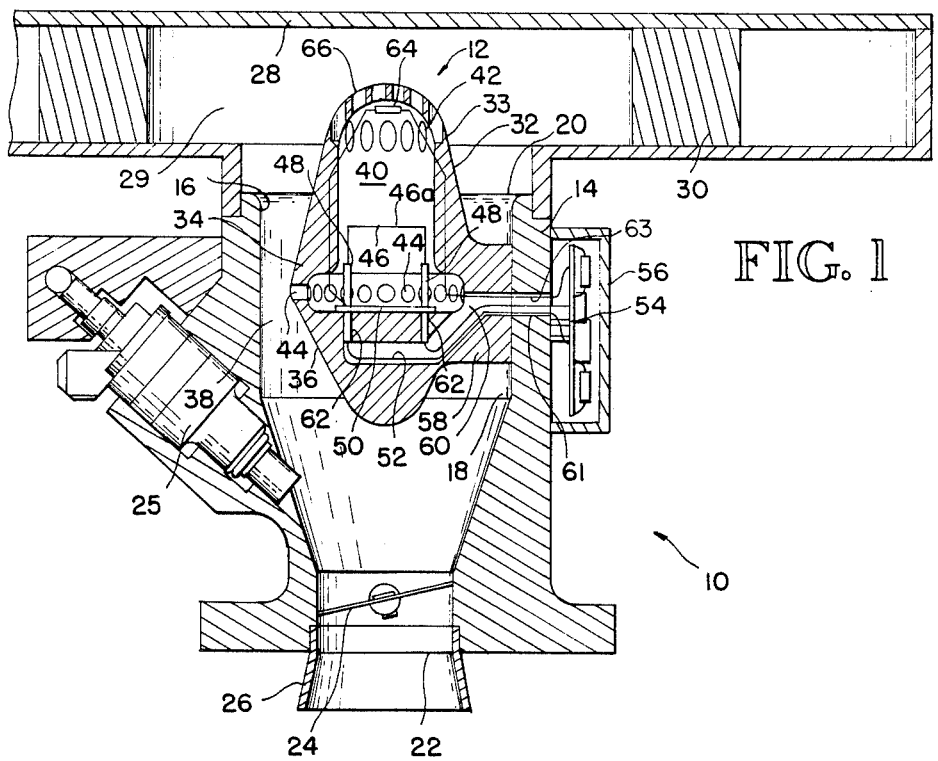
FIG. 1 is a side elevational, sectional view of a throttle body embodying the present invention using a hot wire electronic anemometer.

As shown in the drawings for purposes of illustration, the present invention is embodied in a throttle body, indicated generally by reference numeral 10 for an internal-combustion engine (not shown), and an anemometer sensor mounting assembly, indicated generally by the reference numeral 12. The throttle body 10 has a hollow cylindrical body 14 with an interior sidewall 16 defining a longitudinal air duct 18 leading from an open intake end 20 to an open discharge end 22. A butterfly throttle plate 24 is rotatably positioned within the duct 18 toward the body discharge end 22. A fuel injector 25 is positioned to inject fuel above the throttle plate 24. The body 14 is attachable to the intake manifold 26 of the internal-combustion engine. An air filter housing 28 is attached to the body 14 at the intake end 20 and defines an intake airflow conduit 29. An air filter 30 is disposed therewith to filter the intake airflow to the body air duct 18.

The anemometer sensor mounting assembly 12 includes a generally egg-shaped hollow venturi member 32 having a first member portion 33 projecting out of the body air duct 18 at the body intake end 20 to a position in the intake airflow conduit 29 concentrically within the air filter 30. The venturi member 32 further includes a second member portion 34 positioned generally coaxially within the body air duct 18 upstream from the throttle plate 24. The second member portion 34 has a circumferentially extending exterior surface portion 36 generally corresponding to the cross-sectional shape of the body interior sidewall 16 and spaced inwardly therefrom to form a generally annular restricted venturi air passage 38 therebetween.

The first and second member portions 33 and 34 define an enclosed air channel 40 therewithin extending from the intake airflow conduit 29 exterior of the air duct 18 to the venturi air passage 38 within the air duct. The first member portion 33 has a plurality of entry openings 42 communicating air between the airflow conduit 29 and the channel 40. It is noted that the first member portion 33 need not project out of the body air duct 18 for the throttle body 12 to operate. The second member portion 34 has a plurality of exit openings 44 communicating air between the channel 40 and the annular venturi air passage 38.

In operation, when air flows through the air duct 18 of the body 14 because of the engine air induction process, a pressure differential is created between the entry openings 42 and the exit openings 44, at the low pressure venturi air passage 38 and a fixed proportion of the total throttle body air mass flow is ducted through the air channel 40 of the venturi member 32. A sample flow path of air from a location exterior of the body air duct 18 to a location adjacent to the venturi air passage 38 at the throat of the passage is created and the air flowing therethrough is representative of the air mass flow through the air duct 18. In the air channel 40, and within the sample flow path a heatable anemometer sensor 46 is positioned.

In the embodidment of FIG. 1, the anemometer sensor 46 is a length of temperature dependent resistant wire 46a supported by a pair of spaced apart support posts 48. The support posts 48 are held in their spaced apart position by a rigid plate 50. The support posts 48 are made of a conductive material, and each is electrically connected to one of a pair of wires 52 which are connected to a circuit board 54 mounted exterior of the body 14 in a protective casing 56. The electronic circuitry of the circuit board 54 maintains the resistive wire 46a of the anemometer sensor 46 at a substantially constant temperature and generates an air mass flow indicating signal based upon the air mass flow in the channel 40 sampled by the hot wire.

Figure 2:
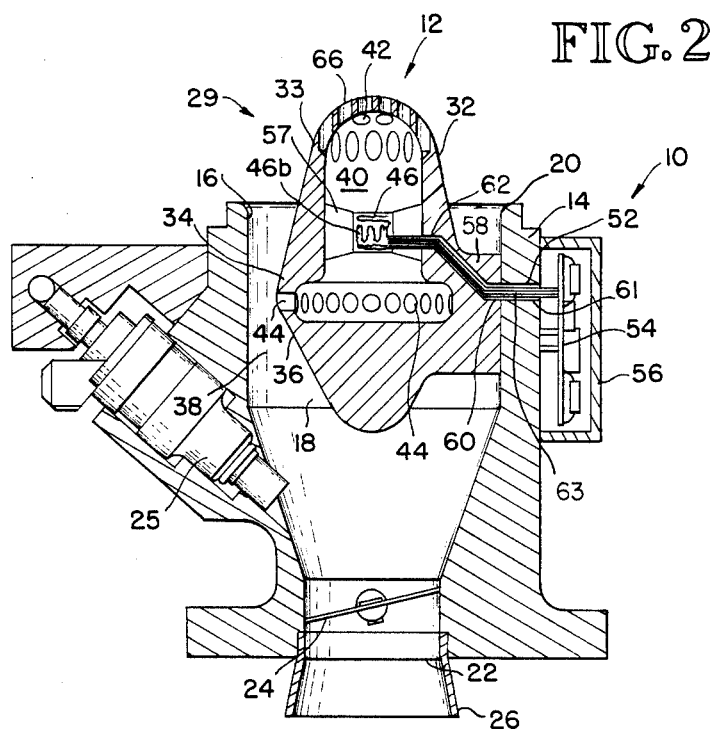
FIG. 2 is a side elevational, sectional view of an alternative embodiment of the throttle body using a hot film electronic anemometer, with the air cover removed.

In the embodiment of FIG. 2, a heatable film 46b is used for the anemometer sensor 46. The film 46b is suspended in the channel between a pair of opposed supports 57 attached to the opposed interior sidewall portions of the second member portion 34 defining the channel 40.

The venturi member 32 is held in place in the air duct 18 by an elongated blade-shaped arm 58 extending generally axially within the duct. The arm 58 is rigidly attached to and extends between the venturi member 32 and the body 14. In the preferred embodiment of the invention, the arm 58 and the venturi member 32 are formed as an integral unit. It has been found that the use of the thin elongated arm 58 provides more stable support for the venturi member 32 with less vibration than even the use of a three point pin attachment between the venturi member and the body 14.

The aerodynamic shape of the arm 58 minimizes its impact on the airflow through the body 14. In addition, the arm 58 provides a handy means for connecting the anemometer sensor 46 within the venturi member channel 40 with the electronic circuitry on the circuit board 54 mounted exterior of the body 14. To accomplish this, an interior passageway 60 is provided in the arm 58 and the second member portion 34. The passageway 60 extends between an aperture 61 through the wall of the body 14 and a pair of apertures 62 in the second member portion 34 opening into the channel 40. The aperture 61 in the body 14 is covered by the arm 58. The passageway 60 is sized to serve as a conduit for the wires 52 connecting the anemometer sensor 46 and the circuit board 54 and also to contain a wire 63 which extends between the circuit board and a posistor 64 positioned within the channel 40 adjacent to the first member portion 33. A similar arrangement is used for the embodiment of FIG. 2, except only one aperture 62 is needed.

The entry openings 42 in the first member portion 33 are evenly circumferentially spaced apart and distributed about the first member portion to draw air into the channel 40 generally uniformly from the air space around the first member portion and outward of the duct 18. The entry openings 42 are small holes formed in an end wall portion 66 of the first member portion 33 which extends across the channel 40. The end wall portion 66 prevents airflow into the channel 40 from the air space exterior of the air duct 18 at the body intake end 20 except through the entry openings. The entry openings 42 each extend angularly outward and then directly upward.

The exit openings 44 in the second member portion 34 are evenly circumferentially spaced apart and distributed about the second member portion to pass air from the channel 40 generally uniformly into the venturi air passage 38. The exit openings 44 exit through the exterior surface portion 36 of the second member portion 34 defining the venturi and are in generally coplanar alignment.

The end wall portion 66 forming a part of the first member portion 32 has an outwardly curving, generally parabolic exterior surface shape. This surface shape creates a low pressure zone in the intake airflow conduit 29 at the entry openings 42 when air flow through the air duct 18 is reversed due to engine backflow pulsation. The end wall shape creates a low pressure substantially at the same low pressure created in the venturi air passage 38 from the reversed airflow.

In operation, the exterior surface shape of the end wall portion 66 forms a bluff body which induces formation of a partial vacuum at the exterior surface when airflow through the air duct 18 is reversed due to engine backflow pulsation. The resulting low pressure at the end wall portion 66 is substantially equal to the low pressure at the venturi air passage 38, hence little or no pressure differential exists between entry and exit openings 42 and 44. As such, little or no air mass flow will pass through the channel 40 when the airflow through the air duct 18 is reversed. In this manner, measurement of an erroneous reverse direction sample airflow through the channel is prevented. It should be noted, that while a parabolic end wall portion 66 is shown and described, the end wall portion may have other suitable shapes which form a bluff body and produce the desirable results described above.

Unlike the single entry and exit openings in the prior art bypass passage, the venturi member 32 of the present invention draws air from a relatively low pressure zone outside of the air duct 18 in the intake airflow conduit 29 through entry openings 42 distributed 360° around the intake airflow conduit, and passes the air in the venturi air passage 38 through exit openings 44 distributed 360° about the air duct 18. In such manner, a true sampling is achieved which is not affected by the air filter 30 developing a clogged spot which in the prior art could cause the air entering the bypass passage not be a valid sample of the airflow through the body, and which is not affected by the position of the exit opening relative to the butterfly throttle plate or the open position of the plate.

With the use of the end wall portion 66 forming a bluff body the problem of the prior art bypass passage producing erroneous readings due to engine backflow pulsations, is overcome. The reversed airflow pulse will reduce the static pressure at the exit openings 44 due to the venturi effect, however, the entry openings 42, which are at the extreme downstream end of the venturi member 32 with respect to the reversed airflow, are also in a low pressure area due to the airflow boundary layer detachment at the bluff rear of the venturi member (at the end wall portion 66). As such, there is no pressure differential across the entry and exit openings 42 and 44, and there is no airflow through the channel 40 as a result of the reversed airflow. Since there is no airflow, the anemometer sensor 40 and associated circuitry of the circuit board 54 produce no erroneous output as a result of the reveresed airflow in the duct 18.

The anemometer sensor mounting assembly 12 may be produced for retrofit into modified throttle bodies of existing designs, and sold as a separate unit. Such an arrangement is believed within the scope of the present invention.

It will be appreciated that, although specific embodiments of the invention have been described herein for purposes of illustration, various modifications may be made without departing from the spirit and scope of the invention. Accordingly, the invention is not limited except by the appended claims.

I claim:

1. A throttle body for an internal-combustion engine, comprising:

a hollow body having a substantially cylindrical and smooth walled interior sidewall defining a longitudinal air duct leading from an open intake end to an open discharge end;

a throttle plate within said duct toward said body discharge end;

a hollow venturi member having a first member portion positioned at said body intake end, and a second member portion positioned generally centrally within said duct upstream from said throttle plate, said second member portion having a central exterior surface portion extending around and spaced inward from said body interior sidewall to form a generally annular restricted venturi air passage therebetween, said second member portion further having a first end exterior surface portion tapering from said central surface portion toward said body intake end and terminating at said first member portion, said first and second member portions defining an enclosed air channel therewithin having at least one entry opening in said first member portion for the entry of air into said channel and a plurality of circumferentially spaced apart exit openings in said second member portion exiting through said central exterior surface portion and communicating with said annular venturi air passage from the exit of air from said channel into said air passage in a circumferentially distributed manner, said channel and said entry and exit openings defining a path of sample airflow from a location at said body intake end to a location adjacent to said venturi air passage representative of the air mass flow through said duct, said first member portion having a convexly and continuously curved exterior surface portion tapering from said second member first and exterior surface portion and terminating at a terminal end positioned toward said body intake end, said first member exterior surface portion being shaped to create a perimeter boundary-layer separation region and downstream thereof a low pressure zone when airflow through said duct is reversed, with said first member exterior surface portion shape forming a bluff body which induces formation of a partial vacuum in said low pressure zone at said first member exterior surface portion when airflow through said duct is reversed due to engine back-flow pulsations, and the low pressure at said first member exterior surface portion being substantially the same as the low pressure at said venturi air passage, said entry opening being positioned sufficiently downstream of said perimeter boundary-layer separation region in said low pressure zone so as to produce pressure at said entry opening substantially equal to the pressure created in said venturi air passage from the reversed airflow, whereby little or no pressure differential exists between said exit and entry openings during engine back-flow and erroneous measurement of said sample airflow through said channel is prevented;

means for supporting said venturi member in said duct;

and a heatable anemometer sensor positioned within said channel in said sample airflow path.

2. The throttle body of claim 1 for use with an annular air cleaner mountable on said body concentric therewith at said body intake end, wherein said first member portion terminates with said first member exterior surface portion positioned generally concentric with said body and exterior of said duct at said body intake end and faces generally axially outward, said at least one entry opening includes a plurality of circumferentially spaced apart entry openings positioned to draw air into said channel generally uniformly from the air space around said first member exterior surface portion and outward of said duct, said entry openings each comprising a generally circular bore in said first member exterior surface portion extending generally axially and opening facing in a direction away from the direction of the airflow through said duct when reversed due to engine back-flow pulsations, whereby said entry openings are positioned substantially equi-distant from any portion of the air cleaner mounted concentric with said body at said body intake end and localized clogging of a portion of the air cleaner will not significantly affect said sample airflow.

3. The throttle body of claim 1 wherein said first member portion projects out of said duct at said body intake end, and said at least one entry opening opens exterior of said duct to define said sample airflow path from a location exterior of said duct at said body intake end to a location adjacent to said venturi air passage.

4. The throttle body of claim 3 wherein said at least one entry opening includes a plurality of circumferentially spaced apart entry openings distributed about said first member portion to draw air into said channel generally uniformly from the air space around said first member portion and outward of said duct.

5. The throttle body of claim 3 wherein said first member portion forms an endwall across said channel preventing airflow into said channel from the air space exterior of said duct at said body intake end except through said at least one entry opening.

6. The throttle body of claim 5 wherein said endwall has an outwardly curving, generally parabolic exterior surface shape.

7. The throttle body of claim 1 wherein said plurality of exit openings are circumferentially spaced apart in close proximity with each other and generally evenly distributed about said second member portion along the full circumferential length of said second member portion, to pass air from said channel in a generally uniformly distributed manner into said venturi air passage at the throat thereof.

8. The throttle body of claim 7 wherein said exit openings are generally circular and oriented generally transverse to said second member central surface portion.

9. The throttle body of claim 7 wherein said exit openings are in generally coplanar alignment and generally evenly circumferentially spaced apart.

10. The throttle body of claim 1 wherein said means for supporting said venturi member is an elongated blade-shaped arm extending generally axially within said duct and rigidly attached to and extending between said venturi member and said body.

11. The throttle body of claim 1 wherein an interior passageway in said arm extends between an aperture in said body interior sidewall covered by said arm and an aperture in said second member portion opening into said channel, said passageway being sized to receive wires connectable to said sensor.

12. The throttle body of claim 1 wherein said enclosed air channel is substantially unobstructed and extends directly between said entry and exit openings, whereby said path of sample airflow is substantially straight and unimpeded within said channel.

13. A throttle body for an internal-combustion engine, comprising:

a hollow body having a substantially cylindrical and smooth walled interior sidewall defining a longitudinal air duct leading from an open intake end to an open discharge end;

a throttle plate within said duct toward said body discharge end;

a hollow venturi member having a first member portion positioned at said body intake end, and a second member portion positioned generally centrally within said duct upstream from said throttle plate, said first and second member portions having a combined, generally ovoid exterior surface shape, said second member portion having an enlarged central exterior surface portion extending around and spaced inward from said body interior sidewall to form a generally annular restricted venturi air passage therebetween, said second member portion further having a first end exterior surface portion tapering from said central surface portion toward said body intake end and terminating at said first member portion, and a second end exterior surface portion tapering from said central surface portion toward said body discharge end and terminating at a terminal end positioned spaced from said throttle plate, said first and second member portions defining a substantially unobstructed, enclosed air channel therewithin, said venturi member having first flow means for communicating air between the air space at said body intake end and said channel through said first member portion, and second flow means for communicating air between said channel and said annular venturi air passage in a circumferentially distributed manner, said second flow means including air passages in said second member exiting at said annular venturi air passage, said channel and said first and second flow means defining a path of sample airflow from a location at said body intake end to a location adjacent to said venturi air passage representative of the air mass flow through said duct, said channel extending directly between said first and second flow means so that said sample airflow path is substantially straight and unimpeded within said channel, said first member portion having a convexly and continuously curved exterior surface portion tapering from said second member first end exterior surface portion and terminating at a terminal end positioned toward said body intake end, said first member exterior surface portion being shaped to create a perimeter boundary-layer separation region and downstream thereof a low pressure zone when airflow through said duct is reversed, with said first member exterior surface portion shape forming a bluff body which induces formation of a partial vacuum in said low pressure zone at said first member exterior surface portion when airflow through said duct is reversed due to engine back-flow pulsations, and the low pressure at said first member exterior surface portion being substantially the same as the low pressure at said venturi air passage, said first flow means including at least one entry opening extending through said first member portion and positioned sufficiently downstream of said perimeter boundary-layer separation region in said low pressure zone so as to produce pressure at said entry opening substantially equal to the pressure created in said venturi air passage from the reversed airflow, whereby little or no pressure differential exists between said first and second flow mean during engine back-flow and erroneous measurement of said sample airflow through said channel is prevented;

means for supporting said venturi member in said duct; and an anemometer sensor positioned within said channel in said sample airflow path.

14. The throttle body of claim 13 wherein said first member portion has an axially outward facing endwall closing said air channel and said first flow means entry opening extends throughs said endwall.

15. The throttle body of claim 14 wherein said endwall has an outwardly curving, generally parabolic exterior surface shape.

16. The throttle body of claim 14 wherein said first member portion extended generally concentrically outward beyond said body intake end and said endwall is positioned exterior of said duct at said body intake end.

17. The throttle body of claim 16 wherein said first flow means includes a plurality of circumferentially spaced apart, generally circular entry openings in said first member portion positioned to draw air generally uniformly from the air space around said first member portion.

18. The throttle body of claim 13 wherein said first member portion projects out of said duct at said body intake end, and said first flow means communicates air between the air space exterior of said body at said body intake end and said channel to define said sample airflow path from a location exterior of said duct at said body intake end to a location adjacent to said venturi air passage.

19. The throttle body of claim 13 wherein said air passages of said second flow means includes a plurality of circumferentially spaced apart exit openings in said second member portion positioned to pass air generally uniformly into said venturi air passage at the throat thereof.

20. The throttle body of claim 19 said exit openings are generally circular and oriented generally transverse to said second member central surface portion.

21. The throttle body of claim 19 wherein said exit openings are in generally coplanar alignment and generally evenly circumferentially spaced apart.

22. The throttle body of claim 13 wherein said means for supporting said venturi member is an elongated blade-shaped arm extending generally axially within said duct and rigidly attached to and extending between said venturi member and said body.

23. The throttle body of claim 22 wherein an interior passageway in said arm extends between an aperture in said body interior sidewall covered by said arm and an aperture in said second member portion opening into said channel, said passageway being sized to receive wires connectable to said sensor.

24. A throttle body assembly for an internal-combustion engine, comprising:
a hollow body having a substantially cylindrical interior sidewall defining a longitudinal air duct leading from an open intake end to an open discharge end;
an intake airflow conduit connected to said body at said intake end;
an annular air filter positioned in said conduit generally concentric with said body at said body intake end and having an interior open space;
a throttle plate within said duct toward said body discharge end;
an elongated hollow venturi member having a first member portion positioned in said airflow conduit exterior of said duct at said body intake, and concentric with said air filter within said air cleaner interior open space, and a second member portion positioned generally coaxially within said duct upstream from said throttle plate, said second member portion having a circumferentially extending central exterior surface portion generally corresponding to the cross-sectional shape of said body interior sidewall and spaced inward from said body interior sidewall to form a generally annular restricted venturi air passage therebetween, said second member portion further having a first end exterior surface portion tapering from said central surface portion toward said body intake end and terminating at said first member portion, said first and second member portions defining an enclosed air channel therewithin extending from said airflow conduit exterior of said duct to said venturi air passage within said duct, said first member portion having a plurality of circumferentially distributed entry openings generally evenly spaced apart and communicating with said airflow conduit for the entry of air into said channel and said second member central exterior surface portion having a plurality of circumferentially distributed exit openings generally evenly spaced apart and communicating with said annular venturi air passage for the exit of air from said channel, said channel and said entry and exit openings defining a sample flow path of air from a location exterior of said duct to a location adjacent to said venturi air passage representative of the air mass flow through said duct, said first member portion having a convexly and continuously curved exterior surface portion tapering from said second member first end exterior surface portion and terminating at a terminal end positioned toward said body intake end, said first member exterior surface portion being shaped to create a perimeter boundary-layer separation region and downstream thereof a low pressure zone when airflow through said duct is reversed, with said first member exterior surface portion shape forming a bluff body which induces formation of a partial vacuum in said low pressure zone at said first member exterior surface portion when airflow through said duct is reversed due to engine back-flow pulsations, and the low pressure at said first member exterior surface portion being substantially the same as the low pressure at said venturi air passage, said entry openings being positioned sufficiently downstream of said perimeter boundary-layer separation region in said low pressure zone so as to produce pressure at said entry openings substantially equal to the pressure created in said venturi air passage from the reversed airflow, whereby little or no pressure differential exists between said exit and entry openings during engine back-flow and erroneous measurement of said sample airflow through said channel is prevented;
means for supporting said venturi member in said duct; and
a heatable anemometer sensor positioned within channel in said sample airflow path.

25. An anemometer sensor mounting assebly for use with an internal-combustion engine throttle body having a generally cylindrical interior sidewall defining a longitudinal air duct leading from an open intake end to an open discharge end with a throttle plate within the duct toward the body discharge end, comprising:
a generally ovoid exterior shaped, hollow venturi member positionable generally concentrically within the throttle body duct with a first end member portion positioned at the body intake end, said venturi member further having a second member portion positionable generally centrally within the duct upstream from the throttle plate, said second member portion having a central exterior surface portion extending around and spaced inward from the body interior sidewall to form a generally annuular restricted venturi air passage therebetween, said second member portion further having a first end exterior surface portion tapering from aid central surface portion toward said body intake end and terminating said first member portion, and a second end exterior surface portion tapering from said central surface portion toward said body discharge end and terminating at a terminal end positioned spaced from said throttle plate, said first and second member portions defining an enclosed air channel therewithin having at least one entry opening in said first member portion for the entry of air into said channel and a plurality of circumferentially spaced apart exit openings in said second member portion exiting through said second member central surface portion and communicating with said annular venturi air passage for the exit of air from said channel into said air passage in a circumferentially distributed manner, said channel and said entry and exit openings defining a path of sample airflow from a location at the body intake end to a location adjacent to said venturi air passage representative of the air mass flow through the duct, said first member portion having a convexly and continuously curved exterior surface portion tapering from said second member first end exterior surface portion and terminating at a terminal end positioned toward said body intake end, said first member exterior surface portion being shaped to create a perimeter boundary-layer separation region and downstream thereof a low pressure zone when airflow through said duct is reversed, with said first member exterior surface portion shape forming a bluff body which induces formation of a partial vacuum in said low pressure zone at said first member exterior surface portion when airflow through said duct is reversed due to engine back-flow pulsations, and the low pressure at said first member exterior surface portion being substantially the same as the low pressure at said venturi air passage, said entry openings being positioned sufficiently downstream of said perimeter boundary-layer separation region in said low pressure zone so as to produce pressure at said entry openings substantially equal to the pressure created in said venturi air passage from the reversed airflow, whereby little or no pressure differential exists between said exit and entry openings during engine back-flow and erroneous measurement of said sample airflow through said channel is prevented;

means for supporting said venturi member in the duct; and an anemometer sensor positioned within said channel in said sample airflow path.

26. The anemometer sensor mounting assembly of claim 25 wherein said at least one entry opening includes a plurality of circumferentially spaced apart entry openings distributed about said first member portion to draw air generally uniformly from the air space around said first member portion.

27. The anemometer sensor assembly of claim 26 wherein said first member portion is positionable to project out of the duct at the body intake end, and said first member entry openings are generally circular and open exterior of the duct.

28. The anemometer sensor mounting assembly of claim 25 wherein said plurality of exit openings are circumferentially spaced apart and distributed about said second member portion to pass air generally uniformly into said venturi air passage.

29. The anemometer mounting assembly of claim 25 wherein said enclosed air channel is substantially unobstructed and extends directly between said entry and exit openings, whereby said path of sample airflow is substantially straight and unimpeded within said channel.

* * * * *

UNITED STATES PATENT AND TRADEMARK OFFICE
CERTIFICATE OF CORRECTION

PATENT NO. : 4,739,651

DATED : April 26, 1988

INVENTOR(S) : David H. Smith

It is certified that error appears in the above-identified patent and that said Letters Patent is hereby corrected as shown below:

Claim 1, line 35, delete "from" and substitute therefor --for--.

Claim 1, line 44, delete "and" (1st occurr.) and substitute --end--.

Claim 11, line 1, delete "1" and substitute therefor --10--.

Claim 24, line 19, delete "cleaner" and substitute therefor --filter--.

Claim 24, lines 46-47, delete the words "a sample flow path of air from a location exterior of said duct" and substitute therefor --a path of sample airflow from a location exterior of said duct at said body intake end--.

Claim 25, line 14, delete "assebly" and substitute therefor --assembly--.

Claim 27, line 3, insert --mounting-- following the word "sensor".

Signed and Sealed this

Thirteenth Day of December, 1988

Attest:

DONALD J. QUIGG

Attesting Officer

Commissioner of Patents and Trademarks